No. 734,177. PATENTED JULY 21, 1903.
J. V. HULL.
SAFETY CLOSURE FOR BOTTLES OR JARS.
APPLICATION FILED MAY 4, 1903.
NO MODEL.
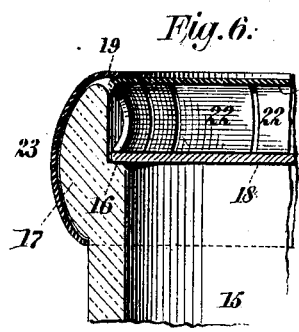
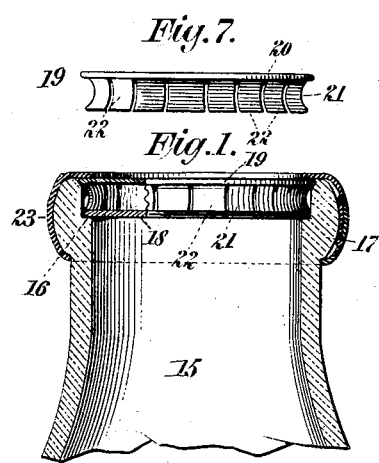
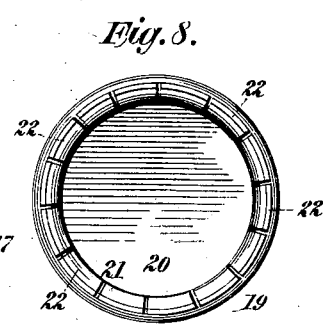
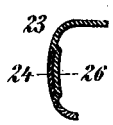
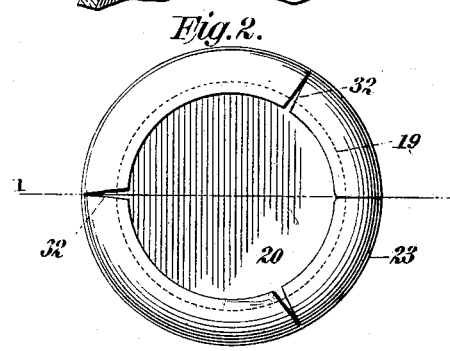
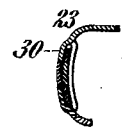
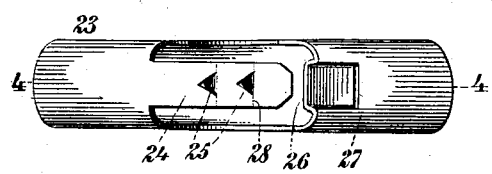
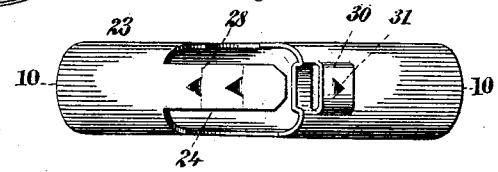
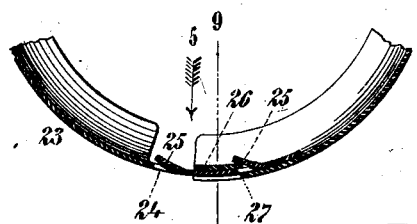
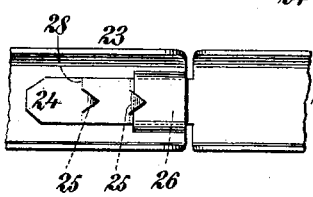
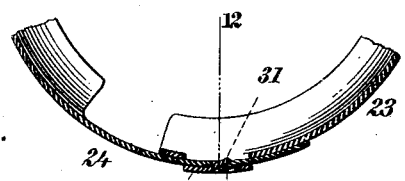
WITNESSES:
Gustave Dieterich
Edwin H. Dieterich
INVENTOR
Joseph Varley Hull
BY
Chas. C. Gill
ATTORNEY No. 734,177. Patented July 21, 1903.

UNITED STATES PATENT OFFICE.

JOSEPH VARLEY HULL, OF BROOKLYN, NEW YORK, ASSIGNOR TO HARRY C. BLYE, OF NEW YORK, N. Y.

SAFETY-CLOSURE FOR BOTTLES OR JARS.

SPECIFICATION forming part of Letters Patent No. 734,177, dated July 21, 1903.

Application filed May 4, 1903. Serial No. 155,577. (No model.)

*To all whom it may concern:*

Be it known that I, JOSEPH VARLEY HULL, a citizen of the United States, and a resident of Brooklyn, in the county of Kings and State of New York, have invented certain new and useful Improvements in Safety-Closures for Bottles or Jars, of which the following is a specification.

The invention relates to improvements in closures for bottles and jars; and it consists in the novel features of construction and combinations of parts hereinafter described, and particularly pointed out in the claims.

The object of the invention is to produce a satisfactory means for closing the mouth of a jar or bottle and which means upon the opening or unsealing of the jar or bottle becomes destroyed or rendered incapable of further use.

I present my invention in this application as applied to an ordinary milk-bottle, and my purpose is to so close the mouth of the bottle that fraud may not be practiced with respect to the contents of said bottle.

It is probably well understood that the county medical society in some locations certifies to the character of certain milk supplied in bottles and that the milk so supplied is known as "certified" milk, the bottles containing it bearing a label or other insignia indicating that the contents of the bottles is certified milk. It has been found that some persons pour from the bottles the certified milk and refill the same with a cheaper grade of milk which is not certified milk, and it is to prevent these practices and to assure to the consumer that the milk received by him is certified milk that the present invention has been produced.

In accordance with my invention the mouth of the bottle may be sealed in accordance with known or any suitable methods, such as by means of the customary paper disk extensively used for sealing milk-bottles, and when my invention is applied to the mouth of the bottle or jar the latter cannot be opened without destroying the safety-locking means produced by me, the presence of these means in their proper condition on the mouth of a bottle being an assurance to the consumer that the bottle contains its original contents.

The invention will be fully understood from the detailed description hereinafter presented, reference being had to the accompanying drawings, in which—

Figure 1 is a central vertical section through the upper end of a milk-bottle sealed and equipped with a closure embodying my invention. Fig. 2 is a top view of same. Fig. 3 is an enlarged detached side elevation of a locking-band comprising a part of my invention. Fig. 4 is a horizontal section of same on the dotted line 4 4 of Fig. 3. Fig. 5 is a detached view of a portion of said locking-band looking in the direction of the arrow 5 of Fig. 4, the engaging ends of the band in Fig. 5 being shown as brought close together. Fig. 6 is an enlarged view corresponding with Fig. 1 of a part of the upper end of the bottle with the closure applied thereto. Fig. 7 is a detached side elevation of a part of the bottle-closure. Fig. 8 is a bottom view of same. Fig. 9 is a vertical section of the locking-band on the dotted line 9 9 of Fig. 4. Fig. 10 is a top view, partly broken away and partly in section, of a modified form of locking-band embracing a part of my invention. Fig. 11 is a side elevation of same, and Fig. 12 is a vertical section of same on the dotted line 12 12 of Fig. 10.

In the drawings, 15 designates the upper portion of an ordinary form of milk-bottle, this bottle having within its mouth an annular shoulder 16 and around the exterior of its upper end an annular shoulder 17, the shoulder 16 being provided to receive a sealing medium or stopper, the customary form of sealing medium being a paper disk 18, which fits closely within the mouth of the bottle and bears upon the said shoulder 16. Within the mouth of the bottle and to bear upon the paper disk 18 I place a tin cap or filler 19, having a flat top 20 and downwardly-extending sides 21, the latter preferably being concaved and slitted, as shown in Fig. 7, to form a series of fingers 22. The flat top of the cap 19 is about on a level with the upper edges of the bottle-neck, and the lower edges of the fingers 22 of said cap bear upon the disk 18 and serve to hold the edges of the disk 18 upon the shoulder 16. By slitting the sides of the cap 19 to form the fingers 22 the latter are made yielding, so as to accommodate themselves to the variation in diameter of bottle-mouths, and the said fingers 22 being curved inwardly or given a concaved outline may readily be caused to adapt themselves to the varying distance between the upper surface of the disk 18 and the upper edge of the bottle-mouth. The milk-bottles 15 are intended to be uniform throughout; but it is well understood that the diameter of the mouths of milk-bottles and the distance between the shoulder 16 and the upper edge of the mouth of the bottle will at times vary, the irregularities being due to the methods of manufacturing the bottles. The paper disks 18 are always at a distance below the upper edge of the bottle-mouth, and this space above the disk 18 is taken up by the cap 19, which forms a filler, a means for holding the disk 18 in position, and a means for leaving the upper end of the bottle flat and without recesses or cavities likely to receive or hold foreign matter.

The presence of the cap 19 alone would not effectually seal the bottle 15 and would afford no greater security than would the disk 18 without said cap 19, and consequently I provide the locking-band 23, which fits upon the exterior shoulder 17 of the bottle, so as to be incapable of vertical movement, and laps over at its upper edge upon the outer edges of the top 20 of the cap 19, as clearly illustrated in Fig. 2, the said band 23 when fastened in position serving to lock the cap 19 and disk 18 within the mouth of the bottle. The locking-band 23 is formed of sheet metal and at its meeting ends is provided with means whereby the band may be locked in position upon the shoulder 17. Referring to Figs. 3, 4, and 5, it will be seen that one end of the band 23 is formed with a tongue 24, having locking-darts 25, and that the other end of said band is formed with the depressed loop 26 and slit 27. The tongue 24 may be formed with one or more of the darts 25, and I illustrate the tongue as being provided with two darts 25, so that the band may be assuredly tightly drawn around the shoulder 17 of the bottle notwithstanding the usual irregularities in the diameter of the bottle horizontally through said shoulder. The tongue 24 is scored or weakened along the base of the darts 25, this scoring preferably extending entirely across the tongue 24, as indicated by the score-lines 28. When the band shown in Figs. 3, 4, and 5 is to be applied upon the bottle, it will be drawn closely over the shoulder 17 thereof and the outer end of the tongue 24 will be passed along the depressed loop 26 and through the slit 27, the movement of the tongue 24 through said slit 27 being continued until the band 23 has closely engaged the shoulder 17 and one of the locking-darts 25 has passed beyond the inner edge of the loop 26, so as to engage said edge of said loop, as clearly illustrated in Fig. 5; at which time it will be found that the locking-band is securely fastened upon the bottle and will effectually hold the cap or filler 19 and disk 18 in position. The consumer will remove the band 23, cap 19, and disk 18 when it is desired to use the contents of the bottle, and the removal of the band 23 will be accomplished by inserting the tine of a fork or other instrument behind the tongue 24 intermediate the facing ends of said band 23 and prying against said tongue until the dart 25 or the tongue itself along the score-line at the base of the dart becomes broken, thus freeing the ends of the band 23 and leaving the latter in condition to be readily removed. Upon the removal of the band 23 the cap 19 and disk 18 may be readily withdrawn from the mouth of the bottle. The removal of the band 23 is only accomplished by its destruction, since when the securing-dart 25 has been broken off or the tongue 24 has been broken through along the line of the base of said dart the band cannot be restored to the bottle, and hence when the consumer receives a bottle of milk with the band 23 thereon in proper condition it will be an assurance that the original contents are within the bottle. The locking-band 23 is thus a benefit to the consumer, and it renders effective the certification of the milk by the county medical society.

In Figs. 10 and 11 I show a modified form of the locking-band 23, this modified form of band not being as desirable as the construction shown in Figs. 3, 4, and 5. The band shown in Figs. 10 and 11 has a tongue 24 corresponding exactly with the tongue 24 shown in Fig. 3, and at the other end of the band there is provided an outwardly-projecting loop 30, through which the tongue 24 passes and which is formed with an inwardly-projecting dart 31 to be engaged by a dart on the tongue 24 when the latter is passed through said loop 30 in the manner shown in Fig. 10. The engagement of the dart 31 with one of the darts on the tongue 24 serves to lock the band upon the bottle and to compel the breaking off of the dart or the breaking off of a part of the tongue 24 before the band may be removed from the bottle. The darts 25 on the tongue shown in Fig. 3 are deflected inwardly, as shown in Fig. 4, to engage the inner edge of the loop 26, while the darts on the tongue 24 shown in Fig. 11 are deflected outwardly, so as to enable them to engage the inwardly-deflected dart 31 of the loop 30. In the construction shown in Figs. 10 and 11 the outer end of the tongue 24 becomes exposed beyond the loop 30, while in the construction presented in Figs. 3, 4, and 5 the outer end of the tongue 24 becomes concealed between the band and bottle, and I regard this latter construction as preferable.

In view of the fact that the band 23 is concaved in vertical section, so as to engage the outer surfaces of the shoulder 17 and the upper outer edges of the cap 19, it is desirable that the said band at its upper edges be slit or have V-shape pieces cut from it, as indicated at 32, Fig. 2, so that the band may be rendered sufficiently flexible to be conveniently applied close upon the shoulder 17 of the bottle and at the proper time opened outwardly therefrom.

I do not limit my invention to the employment of the paper disk 18, since some other form of sealing medium may be employed in lieu of this disk, nor do I limit my invention to the special construction of cap or filler 19, although I regard the cap 19 as the most efficient filler at present known to me for holding the disk 18 in position and for leaving a clean flat upper surface in line with the upper edges of the mouth of the bottle. I desire to claim, broadly, the locking-band for holding the sealing medium within the mouth of the bottle, said band being provided with locking means whereby it is fastened in position in such manner that said means must be destroyed upon the removal of the band from the bottle. The locking-band is not in itself a seal; but it coöperates with the cap or filler 19 in enabling the disk 18 or other equivalent means to effectually seal the mouth of the bottle.

The cap or filler 19 of the special construction hereinbefore described is desirable in that it coöperates with the disk 18 or other sealing medium to close in an efficient manner the mouth of the bottle; but in the absence of the locking-band 23 the cap 19 and disk 18 can be readily removed and the bottle refilled without detection. When the bottle is to contain uncertified milk, the locking-band 23 will not be employed, since there will then be no object in making use of said band, and in that event the concave slitted sides 21 of the cap 19 will upon the insertion of the cap into the bottle-mouth closely engage the side walls of said mouth as a means for firmly holding the cap in position. When the locking-band 23 is employed, it is immaterial whether the sides of the cap 19 actually engage the inner side walls of the mouth of the bottle.

What I claim as my invention, and desire to secure by Letters Patent, is—

1. A bottle having a shoulder within its mouth, a sealing medium within said mouth, and means for holding said sealing medium, combined with a locking-band fixedly encompassing the exterior surface of said bottle about said mouth and engaging said holding means, said locking-band having means whereby its ends may be locked together and also having a weakened portion to be broken during the removal of said band; substantially as set forth.

2. A bottle having a shoulder within its mouth, a sealing-disk within said mouth, and means for holding said sealing medium, combined with a locking-band fixedly encompassing the exterior surface of said bottle about said mouth and engaging said holding means, said locking-band having means whereby its ends may be locked together and also having a weakened portion to be broken during the removal of said band; substantially as set forth.

3. A bottle, and means within the mouth of said bottle for closing the same, combined with a locking-band fixedly encompassing the exterior surface of said bottle about said mouth and engaging said closing means, said band having means whereby its ends may be locked together and also having a weakened portion to be broken during the removal of said band; substantially as set forth.

4. A bottle, a sealing medium within the mouth thereof, and a cap coöperating with said sealing medium and fitting within said mouth, combined with a locking-band fixedly encompassing the exterior surface of said bottle about said mouth and engaging said cap, said band having means whereby its ends may be locked together and also having a weakened portion to be broken during the removal of said band; substantially as set forth.

5. A bottle, a sealing-disk within the mouth thereof, and a cap coöperating with said disk and fitting within said mouth, combined with a locking-band fixedly encompassing the exterior surface of said bottle about said mouth and engaging said cap, said band having means whereby its ends may be locked together and also having a weakened portion to be broken during the removal of said band; substantially as set forth.

6. A bottle having an exterior shoulder about its mouth, and means within said mouth for closing the same, combined with a locking-band conforming to and encompassing said shoulder and engaging said closing means, said band having means whereby its ends may be locked together and also having a weakened portion to be broken during the removal of said band; substantially as set forth.

7. A bottle, and means within the mouth of said bottle for closing the same, combined with a locking-band fixedly encompassing the exterior surface of said bottle about said mouth and engaging said closing means, said band having at one end a tongue and dart and at the other end a slit to receive said tongue and means to interlock with said dart; substantially as set forth.

8. A bottle, and means within the mouth of said bottle for closing the same, combined with a locking-band fixedly encompassing the exterior surface of said bottle about said mouth and engaging said closing means, said band having at one end a tongue and dart and at the other end a slit to receive said tongue and means to interlock with said dart, said tongue also having a weakened portion to be broken during the removal of said band; substantially as set forth.

9. A bottle, and means within the mouth of said bottle for closing the same, combined with a locking-band fixedly encompassing the exterior surface of said bottle about said mouth and engaging said closing means, said band having at one end a tongue and inwardly-turned dart and at the other end an inwardly-projecting loop and a slit to receive said tongue and secure the engagement of said dart with the inner edge of said loop; substantially as set forth.

10. A bottle, a sealing medium within the mouth thereof, and a cap entering said mouth and coöperating with said sealing medium, said cap comprising a top and slitted sides; substantially as set forth.

11. A bottle, a sealing medium within the mouth thereof, and a cap entering said mouth and coöperating with said sealing medium, said cap comprising a top and concave slitted sides forming yielding fingers; substantially as set forth.

Signed at New York, in the county of New York and State of New York, this 2d day of May, A. D. 1903.

JOSEPH VARLEY HULL.

Witnesses:
 CHAS. C. GILL,
 ARTHUR MARION.